(12) United States Patent
Zhang et al.

(10) Patent No.: US 9,362,798 B2
(45) Date of Patent: Jun. 7, 2016

(54) OUTER-ROTOR MOTOR

(71) Applicant: NIDEC CORPORATION, Kyoto (JP)

(72) Inventors: Tiecheng Zhang, Dalian (CN); Peng Li, Dalian (CN); Dongxu Zhang, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 14/314,916

(22) Filed: Jun. 25, 2014

(65) Prior Publication Data

US 2015/0022037 A1 Jan. 22, 2015

(30) Foreign Application Priority Data

Jul. 18, 2013 (CN) .......................... 2013 2 0428976

(51) Int. Cl.
*H02K 5/22* (2006.01)
*H02K 21/22* (2006.01)
*H02K 11/00* (2006.01)

(52) U.S. Cl.
CPC ................ *H02K 5/225* (2013.01); *H02K 11/33* (2016.01); *H02K 21/22* (2013.01); *H02K 2211/03* (2013.01)

(58) Field of Classification Search
CPC .............. H02K 21/22; H02K 11/0073; H02K 2211/03; H02K 5/225
USPC .......................................................... 310/71
See application file for complete search history.

(56) References Cited

U.S. PATENT DOCUMENTS

| 4,554,473 | A | * | 11/1985 | Muller ........................ 310/67 R |
| 4,902,941 | A | * | 2/1990 | Merkle et al. .......... 310/216.064 |
| 6,166,470 | A | * | 12/2000 | Miyazawa et al. ............ 310/181 |
| 2005/0206255 | A1 | * | 9/2005 | Yoshino et al. ................. 310/71 |
| 2010/0000092 | A1 | | 1/2010 | Schneider et al. | |

FOREIGN PATENT DOCUMENTS

| CN | 101505928 B | 1/2011 |
| JP | S57-115574 U | 7/1982 |
| JP | S57-183039 U | 11/1982 |
| JP | 8-88961 A | 4/1996 |
| JP | 2005-057892 A | 3/2005 |

* cited by examiner

*Primary Examiner* — Terrance Kenerly
(74) *Attorney, Agent, or Firm* — Westerman, Hattori, Daniels & Adrian, LLP

(57) ABSTRACT

An outer-rotor motor includes a stationary portion, a rotating portion, and a bearing mechanism arranged to support the rotating portion such that the rotating portion is rotatable about a central axis extending in a vertical direction with respect to the stationary portion. The stationary portion includes a stator, a mounting plate, and a circuit board. The rotating portion includes a shaft, a rotor holder, and a rotor magnet. The mounting plate includes a projecting portion arranged to project radially. The outer-rotor-motor further includes a guide structure connected with the projecting portion. The guide structure is arranged to extend axially, radially outside the rotor holder. A leadwire is electrically connected to the circuit board, and is guided along the guide structure. Provision of the guide structure, which is arranged to guide the leadwire radially outwardly of the rotor holder, contributes to preventing a contact between the leadwire and the rotor holder.

13 Claims, 4 Drawing Sheets

US 9,362,798 B2

OUTER-ROTOR MOTOR

BACKGROUND OF THE INVENTION

1. Field of the Invention

The present invention relates to a motor. In particular, the present invention relates to an outer-rotor motor.

2. Description of the Related Art

A shaft-output motor is often used as a driving apparatus in a portable device, such as a shaver. CN 101505928A discloses a motor as described below. The motor disclosed in CN 101505928A is arranged to drive a cutting member through a transmission device joined to an output shaft thereof. The motor is arranged in a body portion of a shaver. An outer-rotor motor is able to have a smaller thickness than that of an inner-rotor motor having an equivalent output, and the outer-rotor motor therefore has greater portability. In addition, a motor whose output shaft is arranged to extend in a direction opposite to a direction of a rotor holder thereof may be adopted in a portable device, such as a shaver, in order to achieve a reduction in thickness of the portable device. The adoption of the motor as described above contributes to saving a space occupied by the motor in a body of the portable device.

When an outer-rotor motor is adopted, a rotating portion of the motor is exposed to an outside. As a result, a rotor holder included in the rotating portion may be brought into contact with a lead wire arranged to supply power to the motor. If such a contact occurs, the lead wire may be damaged. Accordingly, there is a possibility that a break or a short circuit in the lead wire will occur.

As such, the present invention provides an outer-rotor motor which is able to prevent a contact between a rotor holder and a lead wire.

SUMMARY OF THE INVENTION

An outer-rotor motor according to a preferred embodiment of the present invention includes a stationary portion; a rotating portion; a bearing mechanism arranged to support the rotating portion such that the rotating portion is rotatable about a central axis extending in a vertical direction with respect to the stationary portion; a guide structure; and a lead wire. The stationary portion includes a stator including a stator core arranged on an outer circumference of the bearing mechanism; a mounting plate arranged below the stator to support the bearing mechanism; and a circuit board arranged between the mounting plate and the stator. The rotating portion includes a columnar shaft arranged to extend along the central axis and project in an axial direction from the circuit board; a rotor holder including a cylindrical portion centered on the central axis, and arranged to cover the stator; and a rotor magnet arranged on an inner circumferential surface of the cylindrical portion of the rotor holder, and including an inner circumferential surface arranged radially opposite the stator core. The mounting plate includes a projecting portion arranged to project radially. The guide structure is connected with the projecting portion. The guide structure is arranged to extend axially upward, radially outside the rotor holder. The lead wire is electrically connected to the circuit board, and is guided along the guide structure. Provision of the guide structure, which is arranged to guide the lead wire radially outwardly of the rotor holder, contributes to preventing a contact between the lead wire and the rotor holder.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments of the present invention will be described with reference to the accompanying drawings. A description of the preferred embodiments provided below and the accompanying drawings have been prepared for the sake of convenience in describing the present invention. Accordingly, the scope of the present invention is not limited to the preferred embodiments described below. The scope of the present invention is to be determined solely by the claims provided below. Embodiments of the present invention do not need to include all technical features of the preferred embodiments described below, and may include various combinations of the technical features. No particular scale is used for the accompanying drawings.

The terms "upper", "upward", "upwardly", "lower", "downward", "downwardly", "inner", "inward", "inwardly", "outer", "outward", "outwardly", and so on as used herein are defined merely to describe the preferred embodiments based on the accompanying drawings. The terms "axial direction", "axial", and "axially" as used herein refer to a direction parallel to a central axis. The terms "radial direction", "radial", and "radially" as used herein refer to radial directions centered on the central axis. The terms "circumferential direction", "circumferential", and "circumferentially" as used herein refer to a circumferential direction about the central axis.

Figure 1:
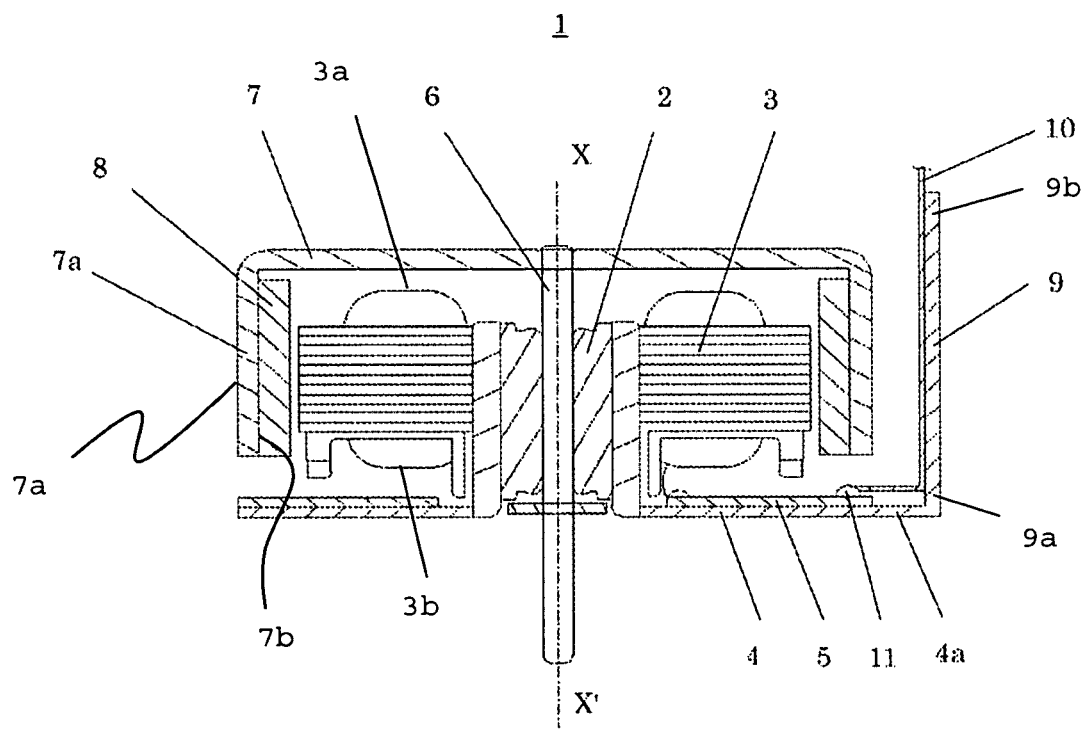
FIG. 1 is a cross-sectional view of an outer-rotor motor according to a first preferred embodiment of the present invention.

FIG. 1 is a cross-sectional view of an outer-rotor motor 1 according to a first preferred embodiment of the present invention. The outer-rotor motor 1 includes a stationary portion, a rotating portion, and a bearing mechanism 2 arranged to support the rotating portion such that the rotating portion is rotatable about a central axis XX' extending in a vertical direction with respect to the stationary portion. Referring to FIG. 1, an upper side and a lower side along an axial direction in FIG. 1 are defined as an upper side and a lower side, respectively, and along a radial direction, a position closer to the central axis XX' and a position farther away from the central axis XX' are defined as an inside and an outside, respectively. As illustrated in FIG. 1, the stationary portion includes a stator 3, a mounting plate 4, and a circuit board 5. The stator 3 includes a stator core arranged on an outer circumference of the bearing mechanism 2. The mounting plate 4 is arranged below the stator 3 to support the bearing mechanism 2. The circuit board 5 is arranged between the mounting plate 4 and the stator 3. The circuit board 5 is preferably a flexible printed circuit board so that a reduction in the thickness of the motor can be achieved. The rotating portion includes a shaft 6, a rotor holder 7, and a rotor magnet 8. The shaft 6 is arranged to extend along the central axis XX', and is arranged to project in the axial direction from the circuit board 5. The rotor holder 7 includes a cylindrical portion 7a centered on the central axis XX', and is arranged to cover the stator 3. The rotor magnet 8 is arranged on an inner circumferential surface of the cylindrical portion 7a of the rotor holder 7, and an inner circumferential surface of the rotor magnet 8 is arranged radially opposite the stator 3.

Referring to FIG. 1, the mounting plate 4 of the outer-rotor motor 1 according to the present preferred embodiment includes a projecting portion 4a arranged to project radially to extend radially outwardly of the rotor holder 7. The outer-rotor motor 1 further includes a guide structure 9 connected with the projecting portion 4a. The guide structure 9 is arranged to extend axially upward, radially outside the rotor holder 7. The outer-rotor motor 1 includes a lead wire 10 electrically connected to the circuit board 5. The lead wire 10 is, for example, soldered to a land portion 11 on a surface of the circuit board 5. This makes it possible to supply electricity to the stator 3 through the lead wire 10. The lead wire 10 is guided along the guide structure 9, and this prevents a contact between the lead wire 10 and the rotor holder 7. As illustrated in FIG. 1, an upper end of the guide structure 9 is preferably arranged at a level higher than that of an upper surface of the rotor holder 7 so that the contact between the lead wire 10 and the rotor holder 7 can be more securely prevented. More preferably, the guide structure 9 is defined integrally with the mounting plate 4. That is, when the guide structure 9 and the mounting plate 4 are integrally defined by a single member, the guide structure 9 and the mounting plate 4 can be easily processed, and a reduction in a cost thereof is achieved. More preferably, the mounting plate 4 is made of a metal (e.g., stainless steel). In the case where the guide structure 9 and the mounting plate 4 are defined integrally with each other, the orientation of the guide structure 9 can be adjusted by bending the guide structure integrally defined with the mounting plate 4 made of the metal. Thus, an improvement in ease with which the motor is assembled is achieved. Moreover, since the metallic material has great strength, a reduction in the thickness of the motor can also be achieved. In FIG. 1, the stator 3 has an upper end 3a and a lower end 3b; the rotor holder has a cylindrical portion 7a which has an inner circumferential surface 7b and an outer circumferential surface 7c; and the guide structure 9 has a first portion 9a and a second portion 9b.

Figure 2:
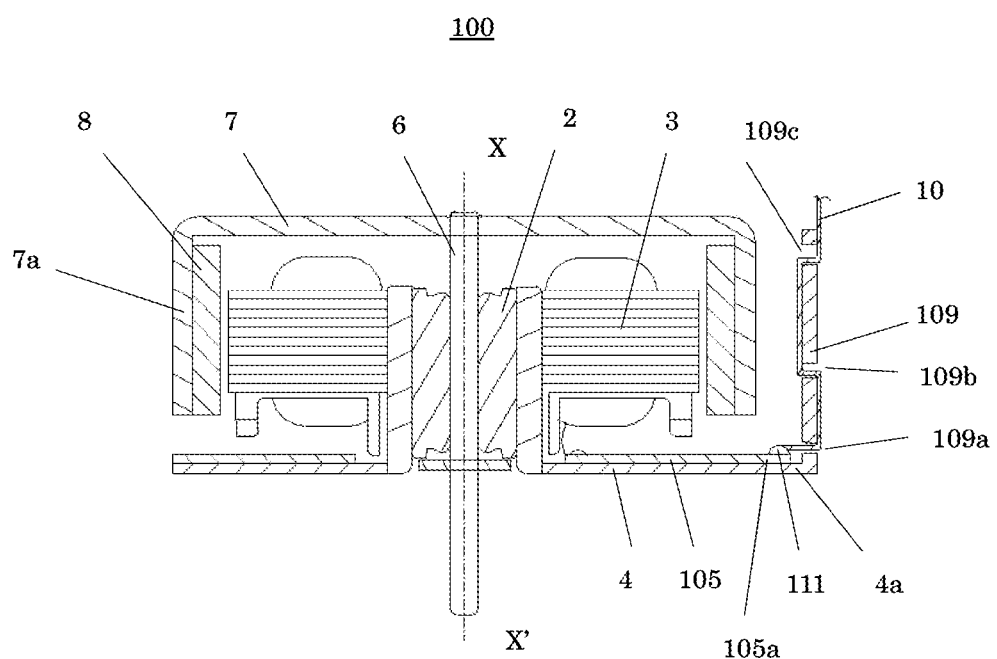
FIG. 2 is a cross-sectional view of an outer-rotor motor according to a second preferred embodiment of the present invention.
Figure 3:
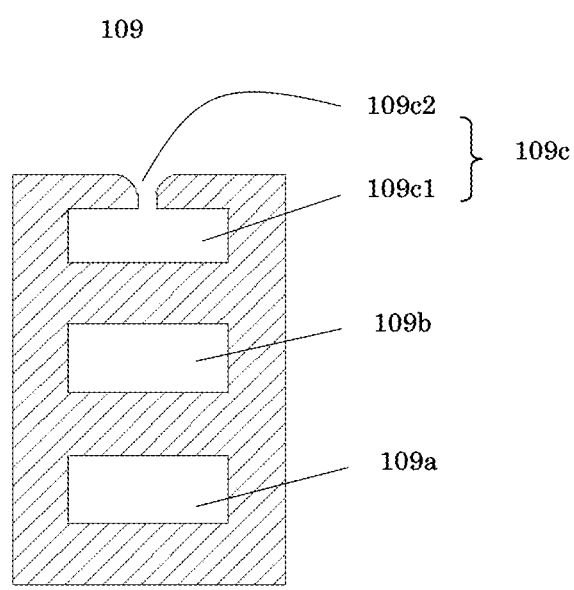
FIG. 3 is a front view of a guide structure of the outer-rotor motor illustrated in FIG. 2.

FIG. 2 is a cross-sectional view of an outer-rotor motor 100 according to a second preferred embodiment of the present invention. FIG. 3 is a front view of a guide structure 109 of the outer-rotor motor 100 illustrated in FIG. 2. The outer-rotor motor 100 according to the present preferred embodiment has a structure similar to that of the outer-rotor motor 1 according to the first preferred embodiment. Accordingly, like members or portions are designated by like reference numerals, and redundant description is omitted while only differences between the outer-rotor motors 1 and 100 will be described below.

Referring to FIG. 2, the outer-rotor motor 100 includes the guide structure 109. The guide structure 109 is connected with a projecting portion 4a of a mounting plate 4. The guide structure 109 is arranged to extend in the axial direction radially outside a rotor holder 7. Referring to FIGS. 2 and 3, the guide structure 109 includes a first guide portion 109a defined by a hole or a cut. A lead wire 10 is drawn radially outward through the first guide portion 109a. The guide structure 109 further includes a second guide portion 109b and a third guide portion 109c each of which is defined by a hole or a cut arranged above the first guide portion 109a. The lead wire 10, which has once been drawn out through the first guide portion 109a, is drawn radially inward through the second guide portion 109b. The lead wire 10, which has once been drawn inward through the second guide portion 109b, is drawn radially outward through the third guide portion 109c. The third guide portion 109c is defined by one continuous cut, and includes an insertion portion 109c1 and a narrow portion 109c2. The insertion portion 109c1 is a portion of an inner circumferential surface of the third guide portion 109c, and defines inside it an opening through which the lead wire 10 is inserted. The narrow portion 109c2 is a portion of the inner circumferential surface of the third guide portion 109c, and is arranged in a direction of an open portion of the cut with respect to the insertion portion 109c1. In addition, the narrow portion 109c2 defines inside it an opening having a width smaller than that of the insertion portion 109c1. The opening defined by the narrow portion 109c2 is preferably arranged to have a width equal to or slightly greater than a diameter of the lead wire 10. Although an upper end of the third guide portion 109c is open upwardly of the guide structure 109 in FIG. 3, one or both of left and right side ends of the third guide portion 109c may be open leftwardly or rightwardly of the guide structure 109 or both.

Figure 4:
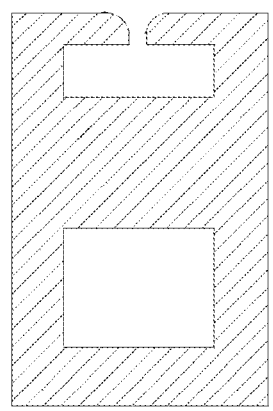
FIG. 4 is a front view of a guide structure according to another preferred embodiment of the present invention.

Referring to FIG. 2, a circuit board 105 of the outer-rotor motor 100 includes an extension portion 105a arranged to extend in the same direction as the projecting portion 4a of the mounting plate 4 and radially outwardly of the rotor holder 7. In addition, the circuit board 105 includes a land portion 111 arranged on an upper surface of the extension portion 105a. The lead wire 10 is electrically connected to the land portion 111. The guide structure 109 illustrated in FIGS. 2 and 3 includes the second and third guide portions 109b and 109c in addition to the first guide portion 109a. Note, however, that a guide structure according to another preferred embodiment of the present invention may include only the first guide portion or only the first and third guide portions as illustrated in FIG. 4.

The present invention has further advantages as described below.

According to one preferred embodiment of the present invention, the guide structure includes the first guide portion defined by the hole or the cut, and the lead wire is drawn radially outwardly of the guide structure through the first guide portion. This contributes to preventing a contact between the lead wire and the rotor holder.

According to one preferred embodiment of the present invention, the guide structure further includes the second guide portion defined by the hole or the cut and the third guide portion defined by the hole or the cut above the first guide portion. The lead wire is drawn radially outwardly of the guide structure through the first guide portion. The lead wire is drawn radially inwardly of the guide structure through the second guide portion. The lead wire is drawn radially outwardly of the guide structure through the third guide portion. The guide structure as described above binds the lead wire, and more securely prevents a contact between the lead wire and the rotor holder.

According to one preferred embodiment of the present invention, the third guide portion is defined by one continuous cut, and includes the insertion portion and the narrow portion. The insertion portion is a portion of the inner circumferential surface of the third guide portion, and defines inside it the opening through which the lead wire is inserted. The narrow portion is a portion of the inner circumferential surface of the third guide portion, is arranged in the direction of the open portion of the cut with respect to the insertion portion, and defines inside it the opening having a width smaller than that of the insertion portion. The above arrangements enable the lead wire to enter into the insertion portion through the narrow portion, making it easier to draw out the lead wire radially outwardly through the third guide portion.

According to one preferred embodiment of the present invention, the opening defined by the narrow portion is arranged to have a width equal to the diameter of the lead wire. This contributes to preventing the lead wire from getting out of the insertion portion.

According to one preferred embodiment of the present invention, the upper end of the third guide portion is arranged to be open upwardly of the guide structure. This makes it easier to pass the lead wire through the third guide portion.

According to one preferred embodiment of the present invention, the upper end of the guide structure is arranged at a level higher than that of the upper surface of the rotor holder. This contributes to more securely preventing a contact between the lead wire and the rotor holder.

According to one preferred embodiment of the present invention, the guide structure is defined integrally with the mounting plate. This makes it easier to process the guide structure and the mounting plate.

According to one preferred embodiment of the present invention, the mounting plate is defined by a metal sheet. In the case where the guide structure and the mounting plate are defined integrally with each other, the orientation of the guide structure can be adjusted by bending the guide structure integrally defined with the mounting plate made of the metal. Thus, an improvement in ease with which the outer-rotor motor is assembled is achieved. Moreover, since the metallic material has great strength, a reduction in the thickness of the outer-rotor motor can also be achieved.

According to one preferred embodiment of the present invention, the circuit board includes the extension portion arranged to extend in the same direction as the projecting portion of the mounting plate and radially outwardly of the rotor holder, the circuit board includes the land portion arranged on the upper surface of the extension portion, and the land portion is electrically connected to the lead wire. Thus, since the land portion is arranged on an opposite side of the circuit board with respect to the mounting plate, a short circuit between the land portion and the mounting plate does not occur. Moreover, since the land portion is arranged on the upper surface of the extension portion, a short circuit between the land portion and the rotor holder does not occur. Specifically, since the extension portion is arranged radially outward of the rotor holder, the land portion is also arranged radially outward of the rotor holder. Accordingly, a contact between the rotor holder and each of the lead wire and a solder on the land portion does not occur. This makes it possible to reduce an axial gap between the rotor holder and the circuit board. This in turn makes it possible to reduce the axial thickness of the outer-rotor motor, and thus to accomplish slimming down of the outer-rotor motor.

According to one preferred embodiment of the present invention, the circuit board is a flexible printed circuit board. The slimming down of the outer-rotor motor can thereby be accomplished.

While preferred embodiments of the present invention have been described above, it is to be understood that the present invention is not limited to the above-described preferred embodiments. In addition, features of the above-described preferred embodiments and the modifications thereof may be combined appropriately as long as no conflict arises.

What is claimed is:

1. An outer-rotor motor comprising:
a stationary portion;
a rotating portion; and
a bearing mechanism arranged to support the rotating portion such that the rotating portion is rotatable about a central axis extending in a vertical direction with respect to the stationary portion;
wherein
the stationary portion comprises:
   a stator including a stator core arranged on an outer circumference of the bearing mechanism, the stator having an upper end and a lower end;
   a mounting plate arranged below the stator to support the bearing mechanism;
   a guide structure;
   a lead wire supported by the guide structure, and
   a circuit board arranged between the mounting plate and the stator, the circuit board opposed to the lower end of the stator;
the rotating portion includes:
   a columnar shaft arranged to extend along the central axis and project in an axial direction from the circuit board;
   a rotor holder including a cylindrical portion centered on the central axis, and arranged to cover the stator; the rotor holder surrounding the upper end of the stator, and
   a rotor magnet arranged on an inner circumferential surface of the cylindrical portion of the rotor holder, and including an inner circumferential surface arranged radially opposite the stator core;
the mounting plate includes a projecting portion such that the projecting portion is arranged radially outside the cylindrical portion;
the guide structure has a first portion and a second portion,
the first portion of the guide structure is connected with the projecting portion;
the second portion of the guide structure extends to a portion axially above, and radially outside, the rotor holder; and
the lead wire is electrically connected to the circuit board, and is provided on the guide structure such that the lead wire is guided from the first portion to the second portion,
the guide structure integral with the mounting plate is a single member.

2. The outer-rotor motor according to claim 1, wherein
the guide structure includes a first guide portion defined by a hole or a cut; and
the lead wire is drawn radially outwardly of the guide structure through the first guide portion.

3. The outer-rotor motor according to claim 2, wherein
the guide structure further includes a second guide portion defined by a hole or a cut and a third guide portion defined by a hole or a cut above the first guide portion;
the lead wire is drawn radially outwardly of the guide structure through the first guide portion;
the lead wire is drawn radially inwardly of the guide structure through the second guide portion; and
the lead wire is drawn radially outwardly of the guide structure through the third guide portion.

4. The outer-rotor motor according to claim 3, wherein the third guide portion is defined by one continuous cut, and includes:

an insertion portion being a portion of an inner circumferential surface of the third guide portion, and arranged to define inside it an opening through which the lead wire is inserted; and a narrow portion being a portion of the inner circumferential surface of the third guide portion, arranged in a direction of an open portion of the cut with respect to the insertion portion, and arranged to define inside it an opening having a width smaller than that of the insertion portion.

5. The outer-rotor motor according to claim 4, wherein the opening defined by the narrow portion is arranged to have a width equal to a diameter of the lead wire.

6. The outer-rotor motor according to claim 4, wherein an upper end of the third guide portion is arranged to be open upwardly of the guide structure.

7. The outer-rotor motor according to claim 1, wherein an upper end of the guide structure is arranged at a level higher than that of an upper surface of the rotor holder.

8. The outer-rotor motor according to claim 1, wherein the mounting plate is defined by a metal sheet.

9. The outer-rotor motor according to claim 1, wherein
the circuit board includes an extension portion arranged to extend in a same direction as the projecting portion of the mounting plate and radially outwardly of the rotor holder;
the circuit board further includes a land portion arranged on an upper surface of the extension portion; and
the land portion is electrically connected to the lead wire.

10. The outer-rotor motor according to claim 1, wherein the circuit board is a flexible printed circuit board.

11. The outer-rotor motor according to claim 1, wherein the guide structure is arranged to perpendicularly extend to the portion axially above, and radially outside, the rotor holder.

12. The outer-rotor motor according to claim 1, wherein the guide structure is entirely opposed to an outer circumferential surface of the cylindrical portion.

13. The outer-rotor motor according to claim 1, wherein the lead wire bridges between the circuit board and the first portion of the guide portion over the projecting portion.

* * * * *